Feb. 23, 1965　　　H. E. CLARK　　　3,170,790
RED SENSITIVE XEROGRAPHIC PLATE AND PROCESS THEREFOR
Filed Jan. 8, 1959
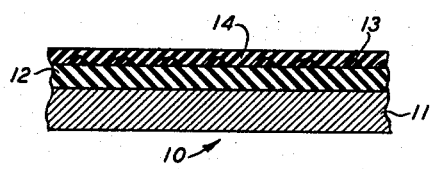
INVENTOR.
Harold E. Clark
BY
ATTORNEY 3,170,790
RED SENSITIVE XEROGRAPHIC PLATE AND
PROCESS THEREFOR
Harold E. Clark, Penfield, N.Y., assignor to Xerox
Corporation, a corporation of New York
Filed Jan. 8, 1959, Ser. No. 785,587
5 Claims. (Cl. 96—1)

This invention relates in general to xerography and in particular to a sensitive plate therefor.

The xerographic process is described in U.S. 2,297,691 by its inventor, Chester F. Carlson, and involves the sensitization of a xerographic plate (as by placing an electrostatic charge thereon) and the exposure of the sensitized plate to an original image to be reproduced. The exposed plate is developed by contacting the plate surface with electrostatically charged, finely-divided powder particles to produce a powder image which is either used in situ or thereafter transferred from the plate to a final support, the transferred image being fixed thereon to form the final print. If desired, the transfer step may be omitted and the image fixed to the plate itself.

As originally described by Carlson, the xerographic plate consisted of a thin layer of sulphur, anthracene or anthraquinone, either singly or in combination, applied to a relatively conductive base by melting and flowing onto the base or by evaporating the material onto the base which is kept at a lower temperature so as to condense the vapor. Mixtures of these materials could be similarly applied as could be the compounds formed by heating sulphur either with anthracene or with linseed oil.

A tremendous advance was made in xerography when it was discovered that vitreous selenium was highly photoconductive. A selenium xerographic plate generally comprised a metal backing plate as aluminum or brass having coated on one side as by vacuum evaporation a layer of very high purity vitreous selenium. In the dark the selenium layer has an extremely high resistivity, but when exposed to light the resistivity is reduced many orders of 1 magnitude, the amount depending on the intensity and wave length of the light. By reason of its high electrical resistivity in the dark, the selenium layer can be charged electrically—which charge is retained for a prolonged period should no light impinge thereon. The outstanding ability of vitreous selenium to hold a charge for an appreciable period in the dark, coupled with its high light sensitivity, have made the selenium plate the standard commercial plate of xerography.

One of the principal deficiencies of selenium, however, is that its photoresponse is limited to the blue and the near ultraviolet. This is particularly critical due to the extensive use of blue and blue-black inks in writing and printing. Because of the high sensitivity of selenium to the blue portion of the spectrum, it is exceedingly difficult to reproduce documents containing all or part of the subject matter thereof in blue ink. While the quantum efficiency of selenium within the spectral range to which it responds approaches unity, that is, 100%, most of the wavelengths in the visible spectrum contribute nothing to the photoresponse of the plate thus limiting the overall speed of the xerographic plate. This is particularly important in that most incandescent light sources emit most vigorously in the longer wavelengths.

Accordingly, since the discovery of the photoconductive properties of vitreous selenium in the late 1940's, there has been a continuing search for means of imparting a significant degree of red sensitivity to plate structures utilizing the photoconductive insulating properties of this material. In general, previous workers in the field have sought to do this by adding other elements to the selenium to impart the requisite red sensitivity. Thus, Ullrich, in U.S. 2,803,-542, suggests adding arsenic to the selenium while Mengali, in U.S. 2,745,327, suggests adding tellurium. Such additions, while successful in imparting red sensitivity and thereby increasing the overall photographic speed of the xerographic plate, accomplish this objective only with a significant increase in the dark decay rate, that is, the ability of the plates to retain an electrostatic charge in the absence of activating radiation is significantly decreased. Consequently, such plates must be used under rapid cycling conditions so as to minimize this effect.

Another approach is to utilize the selenium merely as a charge storage layer while depositing the red sensitive selenium alloy, in this case selenium-tellurium, as a thin layer on top of the thicker vitreous selenium layer. Such a plate is disclosed by B. Paris in U.S. 2,803,541. Plates so prepared retain the extended spectral response of the alloy plates and reduce the dark decay rate. However, the dark decay rate is still objectionably high. Moreover, the formation of the alloy overcoating presents exceptional fabrication difficulties due to the widely different boiling points of the selenium and the tellurium. Now, in accordance with the present invention, it has been found that an improved xerographic plate can be prepared by depositing on the surface of a vitreous selenium plate a discontinuous pattern of a red sensitive semiconductor. The plates as thus modified are characterized by increased red sensitivity and by an increased overall photographic speed. Furthermore, other advantages exist. Thus, there is only a very slight increase in the dark decay rate of the plates and, as no impurities are injected into the vitreous selenium layer itself, there is correspondingly no increase in trapping sites and hence, substantially reduced effect on fatigue in plates prepared according to the present invention as compared to alloy plates.

In the drawing, the figure shows a cross-section of a plate according to one embodiment of the invention.

To illustrate the invention, a commercial xerographic plate was obtained from Haloid Xerox Inc. of Rochester, New York, under the trade name XeroX Copier Plate. The plate comprised a layer of vitreous selenium about 20 microns thick on an aluminum substrate. A 65 mesh photo-resist pattern was placed on half of the vitreous selenium surface and the area so covered treated with technical grade diethylene triamine. The amine was kept in contact with the surface for about 60 seconds. The entire plate was then washed with water. After thorough washing, the photoresist pattern was removed. It was found that the glossy black surface characteristic of vacuum deposited vitreous selenium had been changed in the treated areas to a dull red indicating the conversion of the areas treated to crystalline selenium. The plate so treated was then charged using a corona charging unit. After three minutes storage in the dark after charging it was found that the untreated portion of the plate retained 90% of an initial charge as measured by a vibrating probe electrometer while the treated portion retained about 82% of the initial charge. The plate was then recharged as before and exposed for 15 seconds to a ruby light. It was found that the untreated portion lost only 2% of the initial charge due to this exposure while the treated portion lost about 70% of the initial charge. A second plate was treated as described above, except that no dot pattern was used, i.e., one-half of the plate was uniformly contacted with the diethylene triamine. No visible print could be formed on the treated area when used in the standard commercial xerographic process.

In general, red sensitive semiconductors such as the crystalline selenium used in the example have such a low resistivity that they are completely unable to retain a charge in the dark. Moreover, if a uniform layer of such a semiconductor were to be coated on the surface of the vitreous selenium, the lateral conductivity of the material would destroy any electrostatic image thereon—an effect which was noted on the second plate above. The discontinuous pattern of the semiconductor used is generally in a dot pattern. However, the geometry is not critical and the semiconductor may be deposited in any geometric configuration as in a dot, square or random pattern. In general, the semiconductor should not comprise more than about 50% of the area of the plate, although this is not critical. To obtain adequate resolution, the dot pattern should be no coarser than about 60 lines per inch.

Any red sensitive semiconductor may be used such as the sulfides, selenides or tellurides of antimony, arsenic, bismuth, cadmium, gallium, indium, lead and mercury. Particularly preferred are metallic selenium and arsenic trisulfide or selenide. The dot pattern of metallic selenium is particularly easy to form as by chemical treatment of the vitreous selenium surface. As shown this treatment may comprise contacting the surface with a chemical agent promoting crystallization, such as an organic amine, through a photoresist screen on other dot pattern. Alternatively, the vitreous selenium surface may be electrostatically charged and exposed to an appropriate image to thereby create on the surface of the xerographic plate an electrostatic charge pattern corresponding to the discontinuous pattern desired and the surface then contacted with an electrostatically charged cloud of the chemical agent promoting crystallization. The generation of electrostatically charged liquid sprays and the use thereof in developing xerograpuhic plates are described in detail by L. E. Walkup in U.S. 2,784,109. When the transformation of the vitreous selenium to the metallic selenium in the image areas is completed the crystallization agent is then removed by flushing the plate surface with water.

If one of the other red sensitive semiconductors is used it may be placed on the selenium surface by chemical deposition or vacuum evaporation, in either case through an appropriate screen or photoresist pattern or, where possible, may be dissolved in a suitable solvent and placed on the selenium surface by formation of an electrostatic charge pattern as described above. Alternatively, a uniform layer may be applied and a mechanical engraver used to engrave a discontinuous pattern as a screen pattern. Other means of forming a discontinuous pattern may be used. Where vacuum evaporation is used, the temperatures required to evaporate most of the materials useful herein are sufficiently high as to convert a portion of the selenium on which they deposit to metallic selenium. Arsenic trisulfide and triselenide may be evaporated under approximately the same conditions of temperature and pressure as selenium. Accordingly, because of the increased ease of vaporization thus possible, these materials are also preferred embodiments of the instant invention. Where vacuum evaporation of the semiconductor is used, undue heating of the vitreous selenium may be controlled by mounting the plate on a temperature controlled platen and maintaining a slow rate of evaporation. Organic semiconductors may also be used. Several dyes show significant red-sensitive photoconductivity coupled with too low a resistivity to retain an electrostatic charge in the dark. These materials are particularly suitable for solvent deposition.

It will be seen that the isolated areas of semiconductors are separated from the electrostatically conductive backing of the xerographic plate by an intervening layer of vitreous selenium. This permits greater ease and uniformity of electrostatic charging, as it has been found that the existence of electrically conductive areas running from the surface to the backing act somewhat as "lightning rods" in preferentially attracting electrostatic charges thereby interfering with the efficient and uniform charging of a xerographic plate.

The absorption of activating radiation in a photoconductor creates a hole-electron pair which then move through the photoconductor in accordance with the electrostatic field therein. In general, photoconductors absorb strongly in the spectral range to which they respond. A consequence of this is that the activating radiation generally creates the hole-electron pair close to the surface exposed to the radiation. Thus, charge movement through the photoconductive layer in the xerographic process is predominately of one polarity, and that polarity is determined by the surface of the xerographic plate exposed (i.e., front or back) and the field through the photoconductor (generally the polarity of charging). Most photoconductors have a significantly longer range for one polarity of charge carriers than the other. A short-hand way of describing this (though technically inaccurate) is to call the material p-type (where holes have the longer range) or n-type (where electrons have the longer range). The parameters of plate use (polarity of charging and surface exposed) are selected to make use of this property. Thus, vitreous selenium, a p-type material, is normally charged positively when exposed from the front so that the charge carriers which have the longest path (the holes) are those which have the longest range in vitreous selenium (again, the holes). Recently means have been discovered to modify the range of charge carriers in vitreous selenium whereby either holes or electrons may have a longer range, or they may both have approximately equal ranges. This process is disclosed in U.S. patent application S.N. 706,545, filed January 2, 1958, now Patent No. 3,077,386, by Blakney et al.

In the plate of the instant invention having a discontinuous pattern of a red sensitive photoconductor on a vitreous selenium substrate, the energy barrier between the red sensitive photoconductor and the vitreous selenium will preferentially favor the injection of one polarity of charge carrier over the other. Accordingly, to obtain maximum light response, the polarity of charging the plate should be such as to work with rather than against the energy barrier between the red sensitive photoconductor and the vitreous selenium. If the energy barrier favors the injection of electrons into the vitreous selenium (as is the case where metallic selenium is the red sensitive photoconductor), the vitreous selenium should be deposited as taught in the application S.N. 706,545, now Patent No. 3,077,386, either to have a long range for electrons or equal ranges for electrons and holes and the plate preferably used with negative charging.

The xerographic plate modified as described herein is the conventional plate comprising vitreous selenium. The selenium provides the requisite charge storage and spectral sensitivity from the far blue to the green. The support member may be conductively coated plastic (as aluminized polyethylene terephthalate or cellulose triacetate), conductively coated glass (as with tin oxide, indium oxide, etc.), metal (aluminum, brass, zinc, steel, etc.), etc. The support may be rigid or flexible and in any desired geometric configuration as flat, cylindrical, a belt, etc. The selenium should be between 10 and 200 microns thick, and desirably is from 20 to 100 microns thick.

The thickness of the semiconductor in the dot areas is not critical. In general, the semiconductor should be thick enough to absorb the incident radiation of the desired wavelength and thin enough so as not to attract toner deposits in the areas between dots and thereby adversely affect cleaning and transfer. It has been found that the semiconductor should be between about 0.1 micron and 3 microns thick. Where the dot pattern of semiconductor is formed within the vitreous selenium, as in the examples, the increased bulk of the crystalline selenium may cause a slight elevation of the crystalline selenium areas above the surrounding vitreous selenium. However, such elevation is not needed and a smooth surface may be obtained by polishing the surface. Similarly, from the standpoint of cleanability it is preferred to recess the semiconductor areas into the vitreous selenium to present a smooth surface. However, the cost of fabricating such a structure is high and it has been found that so long as the semiconductor areas are less than about 1 micron above the vitreous selenium surface, there is no important adverse effect on cleaning and transfer. However, if desired, an electrically insulating resin may be coated on the plate to protect the plate surface thus assuring a longer useful life and at the same time making possible a smooth, even surface. Resins which may be used include vinyl resins (such as polyvinyl acetal, polystyrene, etc.), cellulose derivatives (such as nitrocellulose, cellulose acetate, ethyl cellulose, etc.), polyesters, epoxy resins, urethanes, silicones, etc.

In the drawing the figure illustrates a plate having such an overcoating. As there shown, the xerographic plate 10 according to the present invention may comprise an electrically conductive base 11 having coated on at least one side thereof a layer of vitreous selenium 12. On top of the selenium is a discontinuous pattern of a red sensitive semiconductor 13. The light sensitive surface of the plate is covered with an electrically insulating resin coating 14 which is transparent to the activating radiation.

These and other advantages will be obvious to those skilled in the art on reading the instant invention. While the invention has been described herein as carried out in specific embodiments thereof there is no desire to be limited thereby, but it is intended to cover the invention broadly within the spirit and scope of the appended claims.

I claim:

1. A process comprising affixing a foraminous member to a vitreous selenium surface, applying a chemical agent promoting crystallization of vitreous selenium to said surface so that said agent contacts said surface only through the foramina of said foraminous member, removing said agent from contact with said surface after the areas of said surface under said foramina have been converted to crystalline selenium, and then removing said foraminous member from said surface.

2. A xerographic plate comprising a layer of vitreous selenium on an electrically conductive backing member, said selenium layer having a plurality of small, discrete, highly crystallized areas on only its surface opposite said conductive backing member.

3. A xerographic plate comprising a layer of substantially red insensitive vitreous selenium on an electrically conductive backing member, said layer of vitreous selenium having a free surface area opposite said backing member which has been chemically treated in a plurality of small discrete areas with diethylene triamine.

4. A xerographic plate comprising a layer of photoconductive vitreous selenium on an electrically conductive backing member, the surface of said vitreous selenium most remote from said backing member having thereon a pattern of small isolated areas of crystalline selenium extending at most only a small portion of the way through said vitreous selenium layer from said selenium surface remote from said electrically conductive backing member.

5. A process for making an improved xerographic plate comprising forming a uniform layer of the vitreous form of selenium on a supporting substrate, applying a chemical agent promoting crystallization of vitreous selenium to the surface of said layer of vitreous selenium most remote from said substrate, said application being restricted to small discrete areas on said surface and then removing said agent from contact with said surface after the treated areas have been converted to the crystalline form of selenium.

References Cited in the file of this patent

UNITED STATES PATENTS

| | | |
|---|---|---|
| 1,730,505 | Hart | Oct. 8, 1929 |
| 2,575,511 | Bruzau et al. | Nov. 20, 1951 |
| 2,739,079 | Keck | Mar. 20, 1956 |
| 2,803,542 | Ullrich | Aug. 20, 1957 |
| 2,845,337 | Myers et al. | July 29, 1958 |
| 2,856,535 | Vyverberg | Oct. 14, 1958 |
| 2,860,048 | Deubner | Nov. 11, 1958 |
| 2,862,815 | Sugarman | Dec. 2, 1958 |
| 2,862,817 | Meyer at al. | Dec. 2, 1958 |
| 2,863,768 | Schaffert | Dec. 9, 1958 |
| 3,003,870 | Jarvis et al. | Oct. 10, 1961 |
| 3,121,007 | Middleton et al. | Feb. 11, 1964 |

FOREIGN PATENTS

| | | |
|---|---|---|
| 662,197 | Great Britain | Dec. 5, 1951 |
| 683,808 | Great Britain | Dec. 3, 1952 |

OTHER REFERENCES

Keck: J. Opt. Soc. Am., vol. 42, No. 4, pp. 221–5, 1952. (Copy in Sci. Lib.)

Metcalfe et al.: Journal of the Oil and Colour Chemists Association, vol. 39, No. 11, pages 845–856 (1956).